Patented May 15, 1934

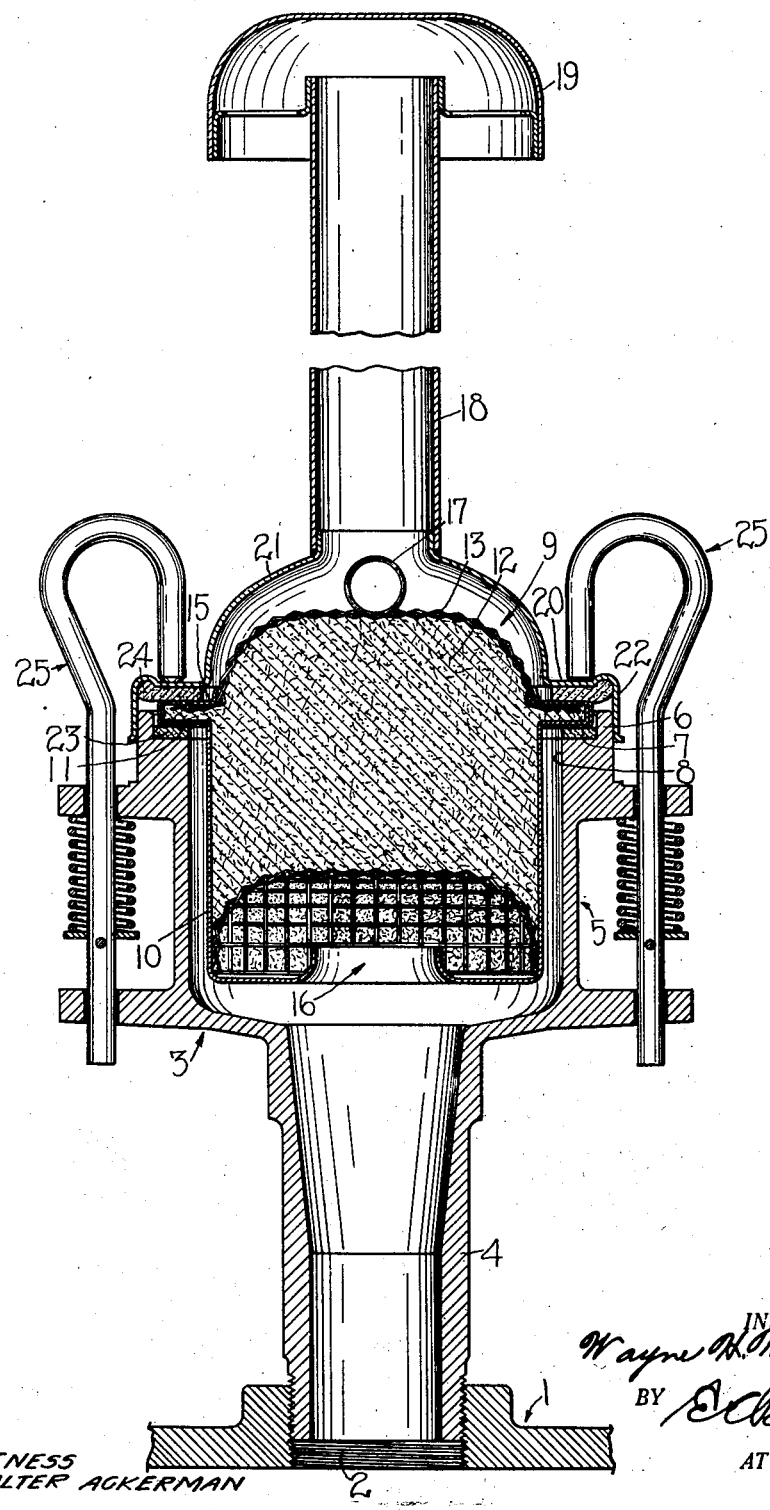

1,958,735

UNITED STATES PATENT OFFICE 1,958,735

AIR CLEANER

Wayne H. Worthington, Waterloo, Iowa, assignor, by direct and mesne assignments, of one-half to John Deere Tractor Company, Waterloo, Iowa, a corporation of Iowa, and one-half to Donaldson Company, Inc., St. Paul, Minn., a corporation of Minnesota Application February 25, 1932, Serial No. 595,013

5 Claims. (Cl. 183—49)

The present invention relates to improvements in air cleaners for tractor engines and the like, such as are used in the air intake line to the carburetor, or in the breather of the crank case.

The invention is more particularly directed to a cleaner of the type comprising a mass of filtering moss intended to be kept saturated with oil. With the continuous passage of air through the cleaner, the oil held by the filter becomes laden with foreign material such as sand, dust, dirt and the like for which reason it is important to prevent any excess oil from the filter from flowing into the engine, i. e. into the carburetor or the crank case, as the case may be. The main object of the present invention is to provide an air cleaner having means for preventing any oil from the filter from flowing out of the filtering element. The manner in which this object is accomplished is described in the following detailed description, reference being had to the accompanying drawing which illustrates a preferred embodiment of the invention as applied to a crank case breather.

In the drawing, the breather with the air cleaner therein is illustrated in cross section, the section being taken vertically and substantially along its vertical axis.

Referring now to the drawing, a fragmentary portion of an engine is indicated at 1 which is preferably a wall of the crank case and is provided with a tapped opening 2 for the receipt of a breather unit. The breather unit is provided with a funnel-shaped base 3 having a tubular stem 4 screwed into the opening 2. The upper portion of the base adjacent the tubular stem of pipe 4 is of considerably larger diameter and comprises a filtering element receiving receptacle 5. The upper end of the receptacle 5 of the base is provided with an annular recess 6 forming a shoulder 7 around the inner peripheral wall 8 for supporting an air filtering element or core 9 which is so constructed as to extend downwardly into the receptacle 5. Incidentally, the base 3 not only constitutes a receptacle and housing for the air filtering core 9 but also acts as a funnel into which oil may be poured when filling the crank case.

The air filtering element of the present construction is in the form of a flanged cup or container 10 having a peripheral flange 11 for supporting the filter upon the shoulder 7 and to center the same within the receptacle 5. This container is filled with any suitable air cleaning substance such as the filtering moss 12 which is confined between an upper screen 13 and a lower screen 14. The upper screen 13 is secured to the container 10 by means of a suitable shaped annular ring 15, while the lower screen is merely supported upon the bottom of the container. The filtering moss is saturated with oil, and in order to prevent any excess or dirty oil from draining out of the filtering moss and running into the crank case, the lower screen is dome shaped so that any of the oil which does drain through the filtering moss will flow laterally outwardly along the screen to the walls of the container. Obviously, the excess oil draining out of the filtering moss is laden with the foreign particles that have been separated out of the air, and in order to prevent this surplus oil from flowing into the crank case, the bottom of the container 10 is provided with an opening 16 the margin of which is flared upwardly. The upwardly flared margin of the opening 16 cooperates with the side walls of the container to form a sump in the bottom of the container wherein the excess grit laden oil is collected and stored until the filter element is removed from the breather and cleaned. The upper screen is substantially of the same shape as the lower screen so as to increase the capacity of the filtering element by confining a greater amount of the filtering moss between the two screens. The upper screen is also provided centrally thereof with a ring 17 for the removal of the filtering element 9 as a whole from the receptacle portion of the base.

A removable air inlet member in the form of a vented stack 18 forms the remainder of the enclosure for the air filtering core element 9. The upper portion of the air inlet member or stack is provided with a deflector 19, while the lower end thereof is provided with an enlarged semi-spherical cap 20 which has a laterally disposed annular shoulder 21 formed thereon having a depending flange 22, the internal diameter of the latter being substantially of the same diameter as the outer periphery of the receptacle 5 to form a substantially air tight seal therewith. The flanged portion of the filtering element 9 is confined between a pair of suitable gaskets or washers 23 and 24 respectively, the washer 23 being disposed upon the shoulder 7, while the washer 24 is carried by the cap 20. By means of the gaskets 23 and 24 and the depending sealing flange 22 of the cap 20, an air tight closure is provided between the air inlet member 18 and the base 3, and all of the air which is drawn into the crank case must necessarily pass upwardly into the deflector 19 and downwardly through the inlet 18.

Any suitable releasable means may be provided for cooperation with this air tight closure to hold the same tightly upon the receptacle portion of the base 3 and a preferred means for accomplishing this purpose as herein provided comprises a plurality of yieldable clamping units 25.

For most efficient operation, the filtering element should be frequently cleaned. This is done by removing the filtering element and agitating it back and forth in a quantity of clean oil to wash the accumulation of grit and dirt out of the filtering moss. This operation at the same time freshly moistens the entire mass of moss.

Although the drawing by way of example discloses a preferred embodiment of the present invention and the foregoing description is specifically directed to this disclosure it is to be understood that many changes may be made in the structure shown without departing from the essence and scope of the invention. Therefore, I do not intend to be limited to the specific details shown and described but only insofar as the appended claims are so limited.

What I claim is:

1. An air cleaner comprising a hollow base adapted to be connected with an engine and having its upper end formed into a filter element receiving receptacle, and a filter element in said receptacle comprising an oil saturated moss filled container, an upper screen closing the top of said container, and a dome shaped screen over the bottom of the container between which the moss is confined, said container having an opening in the bottom the metal around the opening being flared upwardly to form a sump in the bottom of the filter element whereby oil conducted to the sides of the container by the dome shaped lower screen is prevented from flowing through the opening and into the hollow base portion of the cleaner into the engine.

2. An air cleaner comprising a casing and in said casing a filter, said filter comprising a shell having in its bottom an air passage and a marginal drip pan or trap, said filter further having reticulate heads the lower of which is of dome-like form and extended above said drip pan and axial air passage.

3. In an air cleaner, a casing having air inlet and outlet conduits, and a filter interposed in said casing and comprising a shell and a filler therein, said shell in its bottom having an axial air passage and surrounding said air passage an oil drip pan extending to the walls thereof, said casing having a removable cover and said shell having an outstanding flange clamped between the cover and body of said casing.

4. In an air cleaner, a casing having air inlet and outlet conduits, and a filter interposed in said casing and comprising a shell, and a filler therein, said shell in its bottom having an axial air passage and surrounding said air passage an oil drip pan extending to the walls thereof, said casing having a removable cover and said shell having an outstanding flange clamped between the cover and body of said casing, and spring-pressed clamping plungers swivelled on the exterior of said casing and having hook-like upper ends engageable with the flange of said cover to securely but detachably hold the same in position.

5. An air cleaner comprising a casing having a detachable cover, said cover having an air inlet and said casing in its bottom having an air outlet, a filter interposed in said casing and including a shell having a filler and reticulate upper and lower heads, said shell in its bottom having an upwardly pressed flange forming an axial passage, and an oil drip pan surrounding the same, said lower reticulate head being upwardly convex above and spaced from said flange and drip pan.

WAYNE H. WORTHINGTON.